United States Patent [19]

Dewitte et al.

[11] 4,446,207

[45] * May 1, 1984

[54] SPHERICAL BALLS AND THEIR MANUFACTURE

[75] Inventors: Jean Dewitte, Boulogne; Pierre Aymard, Paris, both of France

[73] Assignee: Saint-Gobain Industries, France

[*] Notice: The portion of the term of this patent subsequent to May 6, 1997 has been disclaimed.

[21] Appl. No.: 331,390

[22] Filed: Dec. 16, 1981

Related U.S. Application Data

[60] Continuation of Ser. No. 126,116, Feb. 29, 1980, abandoned, which is a division of Ser. No. 24,090, Mar. 26, 1979, Pat. No. 4,201,560.

[30] Foreign Application Priority Data

Mar. 31, 1978 [FR] France ............................. 78 09544

[51] Int. Cl.³ ............................................... B32B 5/16
[52] U.S. Cl. ................................ 428/402; 428/406; 428/426; 501/33; 264/15; 65/21.1; 65/21.3
[58] Field of Search ................. 264/15, 5; 65/21.1, 65/21.3; 501/33; 428/426, 402, 406

[56] References Cited

U.S. PATENT DOCUMENTS

| | | | |
|---|---|---|---|
| 2,460,977 | 2/1949 | Davis et al. | 264/8 |
| 3,323,888 | 6/1967 | Searight et al. | 264/15 |
| 3,682,666 | 8/1972 | Lacourrege | 65/21.1 |
| 4,201,560 | 5/1980 | Dewitte et al. | 65/21.3 |

FOREIGN PATENT DOCUMENTS 2413724 10/1974 Fed. Rep. of Germany ..... 106/39.7

Primary Examiner—George F. Lesmes
Assistant Examiner—E. Rollins Buffalow
Attorney, Agent, or Firm—Pennie & Edmonds

[57] ABSTRACT

A process of forming glass balls by treatment of particulate vitreous material and a second material comprising carbon material and a carbonated salt. The process is carried out at a temperature, for the particular particulate vitreous material, which corresponds to a viscosity of from about $10^6$ to about $10^{3.5}$ poises with mixing and agitation.

The apparatus includes a furnace having a tube (4) adapted to rotate about an horizontal or inclined axis, delivery means (10, 12, 14) to the tube for the materials to be treated, and heating means (8, 20) for heating the tube and the bed of material from both an external and internal location.

4 Claims, 1 Drawing Figure

1

SPHERICAL BALLS AND THEIR MANUFACTURE

CROSS REFERENCE TO RELATED APPLICATIONS

This application is a continuation of application Ser. No. 126,116, filed Feb. 29, 1980, now abandoned, which application, in turn, is a division of application Ser. No. 024,090, filed Mar. 26, 1979, and now U.S. Pat. No. 4,201,560.

TECHNICAL FIELD

This invention relates to spherical balls including particles of vitreous material manufactured by a process treatment of the particles in a mixture of a second material at high temperature so that, under the effect of surface tension, the particles will take the shape of spheres. This process treatment may be characterized by the term "rounding".

Background Art

The prior art, referring to German Pat. No. 1,141,416, relates to a process wherein the particles to be rounded are mixed preliminarily with a very fine material, one not yielding combustion ashes, such as carbon black, soot or colloidal graphite which form a film on the particles. The particles, then, are mixed with carbon in a pulverulent state and in a charge of sufficient amount to coat the particles and form a combustible bed. During high temperature treatment of the particles, in which a certain amount of the carbon material participates, the amount of air admitted into the furnace and the power dissipated by the furnace is controlled. This aims at avoiding the destruction of the protective carbon film, and, in so doing, the agglomeration of the particles and/or their sticking to the wall of the furnace.

According to the prior art, the mixture of particles of vitreous material and of pulverulent carbon should be prepared very carefully. This is particularly the case with regard to the proportions of the constituents of the mixture which vary as a function of the granulometry of the vitreous material and the method by which the constituents are contacted. But, for these precautions, there is the risk of the particles of vitreous material agglomerating and/or sticking to the wall of the furnace. Additionally, the product may have a poor geometry, a defective surface state, an undesirable coloration, or may be subject to possible other drawbacks.

Further to the above constraints, it has been found that the proposed solutions are poorly suited to certain vitreous materials. This is particularly the case with vitreous materials whose viscosity, in the range suitable for rounding of particles, both varies greatly with temperature and/or with time, and permits the rapid development of certain crystals. The latter occurrence, generally, unfavorably affects surface tension characteristics. Thus, the practice of the process with particles of the so-called ceramizable glasses not only is very difficult, but it generally leads to an agglomeration of particles and/or their sticking to the furnace wall, and to a poor geometry, as set out above.

Disclosure of Invention

The present invention seeks to overcome the drawbacks of the prior art and, as an important aspect, the invention aims at broadening the range of vitreous materials which may be subjected to the process treatment. The vitreous materials, which are diverse, suitably have a viscosity, in the range of temperature suitable for rounding of particles, which varies greatly with temperature, and/or with time and may include materials such as slags and ceramizable glasses. The invention, also, is directed to the mixture in which the materials are introduced for treatment at high temperature. And, as will become clear, the improved quality of product is derived with reduced cost, primarily resulting from a lessened criticality of precaution in the preparation of the mixture and the treatment in a rotary furnace.

In the process treatment, particles of vitreous material first are mixed with a second material comprising a charge of pulverulent carbon material and then heated in a rotary furnace. The unit volume of the vitreous material corresponds to that of the balls to be produced during rounding and the temperatures of the furnace are selected so that, as viscosity drops, the action of surface tension allows the particles of vitreous material, during passage through the furnace, to become spherical in shape. On leaving the furnace, the balls may be rapidly cooled, thereby to perform a heat hardening treatment both to improve mechanical performance and resistance to crushing. The balls, then, generally are washed to remove residue that may be stuck to their surface.

The second material added to the particles of vitreous material to be treated serves primarily to prevent the particles from agglomerating and/or sticking to the furnace wall. In practice, the carbon material may be charcoal. The second material preferably includes a powdered carbonated salt which is decomposable by heat in the presence of carbon within a range of temperature utilized in the process for treating the particles of vitreous material whose viscosity within the range of temperature is from about $10^6$ to about $10^{3.5}$ poises. The carbonated salt may be limestone (whose chief constituent is calcium carbonate) or dolomite (a carbonate of calcium and magnesium) or a mixture of the carbonated salts in a fine powder.

The proportions of the various materials are adjusted so that a gaseous release occurs throughout the range of temperatures covering the range of viscosities of the particles of vitreous material to be rounded.

It has been found that a release of gas should appear at relatively low temperatures to activate the mobility of the bed containing the particles of vitreous material to be rounded as soon as the particle exhibits a viscosity able to reduce the risks of sticking or agglomeration, indicated above. Dolomite and limestone advantageously may be used for the purpose of releasing gas through dissociation. Dolomite, or a mixture of dolomite and limestone is preferred, however, for reasons that dissociation commences at a lower temperature than that of limestone alone, and it continues or extends over a wider range of temperatures.

A catalyst such as sodium chloride may be used if it is desired to lower the dissociation temperature of either carbonated salt.

The use of a carbonated salt in the process described herein provides an important aspect, namely that of slowing the rate of combustion of the carbon material. It is believed that this is achieved by the release of gas in the decomposition of the carbonated salt. By slowing the combustion rate, it is possible to resort to the use of a slight amount of carbon material, and this translates as a reduction in fabrication cost relating to consumable materials. These costs may be substantial. Further, it is possible to carry out the process which is described in a much simpler and more reliable manner.

The constituents of the mixture may be passed into the rotary furnace independently and in any manner as by the use of several measuring devices. Preferably, however, the carbon material which is pulverulent charcoal will have been mixed with at least one or both of the carbonated salts. In this manner, prior art operations in creating a protective film of carbon material adhering to the surface of the particles of vitreous materials is obviated.

An important advantage to be achieved by the process as described herein is that the process may be carried out in a furnace which, contrary to the German patent referred to above, need not be sealed for good fluid tightness. To this end, as described, the rate of combustion of the charcoal is slowed by the presence of the carbonated salt or salts and its dissociation within the process temperatures.

Further, the process described herein yields excellent results with particles of vitreous material of varied character. It particularly applies advantageously to vitreous materials unstable in a reducing medium. The process conditions are determined by the characteristics of the materials used, such as the differences in behavior of limestone and dolomite under the temperatures of the process and differences in vitreous materials, particularly their viscosity, the dimensions of the particles, and the parameters of the treatment furnace.

The second materials which are described as pulverulent have a granulometry preferably mostly less than 50 $\mu$m. The materials including charcoal and carbonated salts for example, limestone and dolomite, are readily available and the latter are moderate in cost.

The relative proportions of the second materials may be broad in range. In carrying out the process with ceramizable vitreous material, the ratio of the weights of charcoal and carbonated salts advantageously is from $\frac{1}{8}$ to $\frac{1}{3}$ and the materials preferably will comprise at least 80% of the weight of the ceramizable vitreous material. Further, if the carbonated salt be a mixture of limestone and dolomite, it is preferable that the dolomite be present in an amount to constitute at least 50% of the weight of the two salts.

The amount of charcoal, as previously stated, from the standpoint of cost should be kept to a minimum. This is advantageous, also, from the standpoint of the elimination of processing steps of washing of the balls following treatment.

The relative proportions of the second material and the particles of vitreous material may vary within broad limits, also. Good results have been obtained, depending on the product treated and possible use of additives, such as the abovementioned catalyst, through use of about 30 to about 120 kg of the second material per about 100 kg of particles of vitreous material.

While additives may be employed in carrying out the process, it generally is not advantageous to use additives in large proportion. To this end, most additives are consumable, increasing production costs, and many additives prejudicially slow the heating of particles of vitreous material in the bed in that they react endothermically.

Preferably, it is advantageous, and this is particularly the case with particles of ceramizable vitreous material, to rapidly heat the particles to the temperature at which they are able to assume the shape of spheres. Rapid heating of the particles is advantageous, also, to substantially reduce or eliminate the development of crystals which affect both viscosity and surface tension of the particles of vitreous material as they are forming or assuming the shape of spheres. For example, for balls with a diameter on the order of 2 mm, this rise in temperature should take place during a period of about 2 minutes of even less. Rounding then requires a period less than 2 minutes.

The process is carried out while constantly mixing the particles of vitreous material as they form or assume the shape of spheres. A continuous device of the rotary furnace type provides very good results. In such a furnace, a rotary tube may be heated externally by a source of heat. However, if the power to be dissipated and the temperature called for by the process is particularly high, it may be advantageous to supplement the source of heat with a second source. The first source may be provided by electrical resistance heaters mounted in the bed or heating box of the furnace and the second source may be by means of a tube with a diameter smaller than the rotary tube heated on the inside in any suitable manner including a fuel oil or gas burner. The rotary tube is made up of refractory steel sheet and the heating sources make it possible to bring the particles of vitreous material to be treated to temperatures on the order of 1100° C. within the constraints of time, as discussed. These rotary furnaces are suitable for forming balls from numerous types of easily crystallizable vitreous material and, in particular, vitreous material able to lead to vitroceramic products by a heat treatment of controlled crystallization, or ceramizating. It has been found that, for at least certain of these vitreous materials, ceramization started during rounding of particles not yet crystallized, or mother glass, could be achieved immediately thereafter during a single pass in the rotary furnace. Crystallization rates very close to those that are obtained in the treatment of glass in mass at a ceramization temperature for at least 30 minutes are attained by the present process for forming balls having a diameter of about 1 mm in about 2 minutes after rounding. This possibility is extremely advantageous, not only from the standpoint of costs of production, but also for the performance of the products and the resistance to crushing displayed by the resulting balls. it appears ceramization in the bed of the mixture is achieved advantageously without undergoing degradation of the surface of the balls after fire polishing.

Other advantageous of the process as has been described and the improved product formed by the mixture resides in the final properties of the balls. Thus, it is found that the balls substantially need not undergo a washing in that there is little or no residue accumulation on the surface and that separation to size may be achieved by simple screening from the materials coming from the rotary furnace.

BRIEF DESCRIPTION OF DRAWING

The details of the invention will be described in connection with the accompanying drawing, wherein.

BEST MODE FOR CARRYING OUT THE INVENTION

Figure 1:
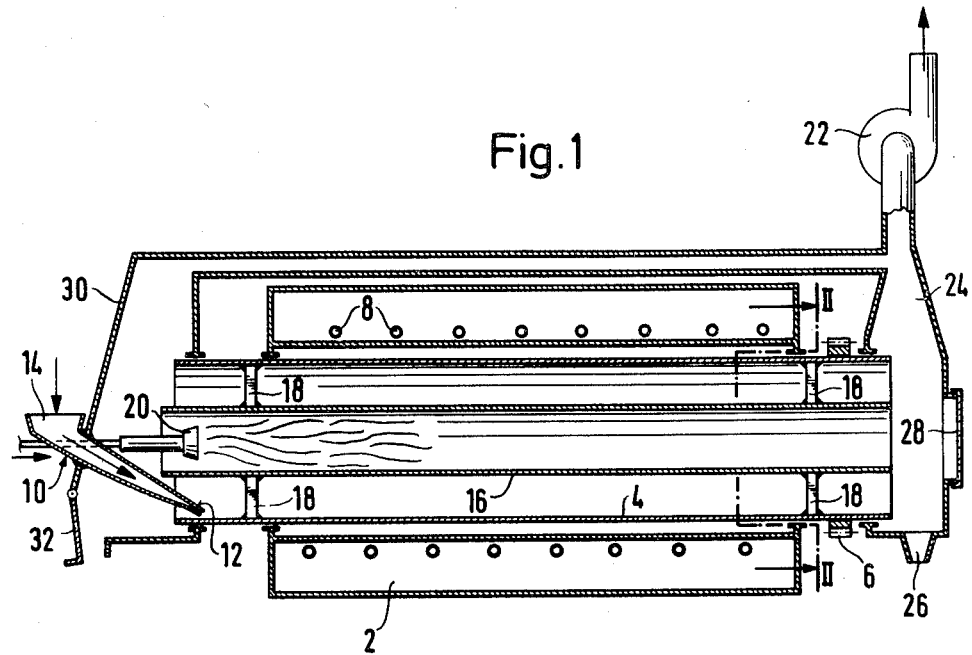
FIG. 1 is a schematic view in elevation of a furnace for use in carrying out the process of the present invention; and, FIG. 2 is a schematic view of a portion of the interior of the furnace generally as seen along the line 2—2 in FIG. 1.

A furnace of the rotary type utilized in carrying out the process may be seen to best advantage in FIG. 1.

Figure 2:
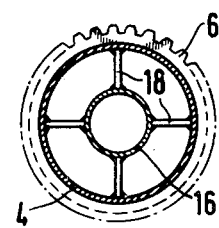

The furnace includes a heating box 2 which may be supported by any particular form or adaptation of support structure (not shown) as may be conventional. The heating box may be of any particular cross-section providing a cylindrical opening therealong from the upstream to the downstream end. A tube 4 is supported within the opening and as may be seen in FIG. 2 is concentric with the inner surface of heating box 2. As may be seen in FIG. 1, the tube is of a length greater than the length of the heating box thereby to extend to locations both upstream and downstream of the ends. Preferably, the tube is formed of refractory steel sheet, and without any intention to limit the tube to a particular construction, the sheet may have a thickness of about 6 mm and the tube may be of a length of about 6 m. The diameter of tube 4 preferably is less than about 0.4 m.

Tube 4 is supported on rollers (not shown) and is adapted for movement rotationally relative to heating box 2. To this end, a crown gear 6 or similar structure is carried by the tube within the region extending downstream of the downstream end of heating box 2. The tube may be driven by means of a pinion at the output of a prime mover (both not shown) which is in driving engagement with crown gear 6. The prime mover may be a motor capable of a variable speed drive, thereby to drive the tube at a speed within the range of about 6 to 15 rpm.

As illustrated in FIG. 1, a form of seal is provided at the cylindrical opening between the heating bed 2 and tube 4. The seal which need not be completely fluid tight, as has been found necessary in certain prior art furnaces, is schematically illustrated by the short feet at the locations wherein the walls of the heating bed are proximate the tube (see FIG. 1).

A plurality of heaters 8 are arranged within and along the heating box between the upstream and downstream ends. As illustrated in FIG. 1, the heaters are arranged within the vicinity of tube 4 and one or more heaters are located in each of a plurality of distinct zones within the heating box. The heaters may be electrical resistance heaters and the heaters within each zone are separately controlled to a range of temperatures for carrying out the process to best advantage. In the preferred embodiment, the heating box includes a plurality of four zones, each of which may extend throughout substantially an equal length between the upstream and downstream ends. If the length of tube 4 is 6 m, the length of each zone may be about 1.2 m in length. Each zone may be provided with a pair of heaters spaced to provide substantially uniform heating therealong.

As previously indicated, the crown gear 6 and the driving means is located within the downstream extension of tube 4. According to that discussion, if tube 4 is mounted in a position of symmetry relative to heating bed 2 sufficient length of tube 4 will be available not only for adapting the tube for movement rotationally by drive means within the downstream extension, but also to provide for the mounting of hood structure around the tube within both extensions thereby to isolate the interior of the furnace from the surrounding atmosphere. Again, a form of seal similar to the seal previously described may be used.

According to the process, it may be desirable to change the speed of movement of the bed of vitreous material through the furnace. To this end, the slope of tube 4 into which material is received and the speed of rotation of the tube are determined. Thus, the motor is controlled and the slope of the heating box 2 is adjusted by means of adjusting structure (not shown) which may be considered conventional.

Vitreous material is received within the upstream extension of the tube 4 through chute 10 angled toward the tube from the hopper 14. Vitreous material exits the chute at a tip 12 or receipt by the hopper. Any particular means as may be conventional, although not shown, such as, measuring means in the form of a weighing conveyor may be used. Additionally, it may be that certain constituents are previously mixed to reduce fly-off. Fly-off also may be reduced by locating the tip in close proximity to the lower generatrix of the tube.

A tube 16 is located within tube 4. Referring to FIGS. 1 and 2, tube 16 is of a length in excess of the length of tube 4 to extend to a position slightly upstream of the latter and is disposed coaxially therealong. Tube 16 may have an outer diameter of about 12 cm thereby to provide an annular space for movement of the bed of material along tube 4. A plurality of braces 18 extend radially outwardly between the tubes for supporting tube 16. The braces may be joined to the tubes by any conventional means, such as welding. The braces may be arranged equidistantly about tube 16 and preferably four braces at each end maintain the coaxial relation of the tubes. As may be apparent, additional bracing may be incorporated at other locations along the tubes if such is deemed to be necessary.

A burner 20 is located within the upstream region of tube 16 for purposes of supplementing the supply of heat within the regions of the upstream zones of the heating box 2 and accelerating the rise in temperature. To this end, the burner is employed when the power to be dissipated and the temperature to be reached along the heating box is high. The head of burner 20 is positioned within tube 16 so that substantially all of the heat energy by convection flow will be localized within tube 16. The burner 20 may be supported by the furnace in any particular manner and connected to a supply of fuel oil, gas or the equivalent having a relatively high heating power.

Hood structure is located at each end of the tube 4 thereby to surround the furnace and assure a measure of isolation between the environment both within and without the furnace itself. The hood structure at the upstream end of the furnace is generally indicated by the reference numeral "30" and the hood structure at the downstream end of the furnace is generally indicated by the reference numeral "24∞. The hood structures may be individual structures or they may be connected as illustrated in FIG. 1. As previously discussed, the hood structure is sealed to tube 4 within the regions of its ends. The hood structure provides an enclosure about the furnace and a suction fan 22 is connected to the enclosure within the region of the downstream portion of the furnace. The suction fan draws air, burning gases, and so forth, from the enclosure and passes the drawn medium to a purification device, such as a cyclone (not shown).

A hopper 26 generally in the form of a funnel is formed within the downstream portion of the enclosure. Thus, solid products having undergone treatment within the furnace may be recovered and conveyed to further downstream treating stations at which, among other operations, unsatisfactory product may be eliminated and satisfactory product may be separated according to size. A peephole 28 formed by a transparent medium, such as glass plate or plastic capable of withstanding high temperatures, is located within the region of the downstream end of the enclosure for purposes as may be apparent.

A flap 32 is located within the upstream portion of the enclosure for controlling the flow of air through the enclosure from the entry to and through suction fan 22. The flap may be controlled in operation between positions of closure and of full opening in any particular manner as may be conventional.

The process for forming vitroceramic balls by the apparatus described now will be set out in detail.

The particles of vitreous material to be treated are obtained by grinding and sizing of unceramized cullet, or mother glass, having a granulometry of from about 1 to about 3.5 mm and have a composition, in weight percentages, as follows:

| $SiO_2$ | 57.1 | CaO | 18.2 | $LiO_2$ | 0.35 |
|---|---|---|---|---|---|
| $Al_2O_3$ | 9.1 | MgO | 3.0 | $B_2O_2$ | 3.9 |
| $Fe_2O_3$ | 0.1 | $Na_2O$ | 1.1 | ZnO | 0.7 |
| $ZnO_2$ | 0.5 | $K_2O$ | 5.6 | S(total) | 0.34 |

The second material including a pulverulent carbon material, such as charcoal in an amount of 30 kg, dolomite in an amount of 40 kg, and limestone in an amount of 30 kg, all having a granulometry less than 50 μm, was prepared in a standard mixer.

The process was carried out with heating from both the primary (electrical resistance elements 8) and supplementary source (supplied by burner 20), and the flow of burning fluid was regulated so that the temperature on the wall of the rotary tube within the first heating zone was about 1150° C. The temperatures of the furnace wall at a median location of each of the first three zones were maintained at 1146° C., 1155° C. and 946° C., respectively. Further, the average temperature of the mixture to be treated is raised at an average rate on the order of 500° C. per minute.

The drive to the rotary tube was set at about 8 rpm and the rotary tube was set at a slope of about 4%. Particles of vitreous material, together with the second material, in the ratios as previously discussed, were delivered (through the tip 12 of chute 10) at a rate of 1 kg/min. Average travel-through time of the treated product was 6 to 8 minutes. Temperatures of the treated product, at the level of thermoelectric couples for regulating the temperature in each of the four heating zones were 962° C., 1038° C., 850° C. and 675° C., respectively.

A mixture of decarbonated powder, free of unburnt charcoal, and ceramized glass balls, was collected at hopper 26. Thereafter, following standard screening operations, glass balls exhibiting defects in shape were segregated from the defect-free glass balls, the latter of which were sorted to categories by diameter. The diameters ranged from about 1 mm to as large as 1 cm. Further, the defect-free glass balls had a beautiful surface state, and it was found that it was not necessary, in contrast to known processes, to resort to any additional treatment, such as washing with a detergent solution.

The manufacturing conditions described above resulted in the following results, when 100 kg of particles of vitreous material and described proportions of the second material were treated:

| Glass balls with diameters between 0.8 and 3 mm | 97 kg |
|---|---|
| Glass balls not spherical (ovalizing less than 0.9), agglomerated, etc. (rejects) | 3 kg |

Certain physical and chemical properties of the resulting glass balls have great interest, particularly resistance to mechanical impacts, resistance to crushing (5000 bars), resistance to abrasion (comparable with that of steatite), and rate of crystallization. The latter is actually 31%, mainly in the form of wollastonite α (18%) and wollastonite β (13%), values quite comparable to those obtained by ceramization treatment for a long period of plates of the same glass with large dimensions.

These properties, and others (specific gravity of 2.6, resistance to chemical agents, resistance to thermal shock, deformation temperature greater than 1000° C.), make these balls able to be used in numerous fields: grinding of paint pigments, catalyst supports, underground support for oil exploitation, lining of exchange columns, shot blasting, and other uses.

The same process was successfully applied to very diverse vitreous products, other vitroceramics, slags, pyrex, lead crystal, and in particular, very ordinary materials, such as plate glass or bottle glass cullet. In these latter cases, the treatment conditions of the above example are often directly usable, even when lower transformation temperatures can be advantageously used to lower the maximum treatment temperature, the length of treatment or the proportion of additional mixture. Balls exhibiting the high performances indicated in the above example were obtained by treatment according to the invention, under the conditions of said examples, for glasses of the following composition range (in weight %):

| $SiO_2$ | 56.0 to 58.0 |
|---|---|
| $Al_2O_3$ | 8.2 to 9.7 |
| CaO | 17.5 to 19.0 |
| MgO | 2.8 to 3.3 |
| $K_2O$ | 5.1 to 5.9 |
| $Na_2O$ | 1.0 to 1.2 |
| $Li_2O$ | 0.2 to 0.5 |
| $B_2O_2$ | 3.5 to 4.5 |
| ZnO | 0.5 to 1.0 |
| S (total) | 0.2 to 0.5 |

As a further indication of the advantages of the invention, it is interesting to note the results of treatment wherein a material is used in substitution for the material including dolomite or limestone or a combination of the two carbonated salts into which the pulverulent carbon material (charcoal) is dispersed.

Thus, the substitution of very fine sand resulted in a very low production and poor quality. Additionally, the glass balls agglomerated and/or stuck to the furnace wall. Further, grains of sand adhered to the surface of the glass balls.

A mixture of plaster and charcoal, which according to chemical manuals leads at red heat to a reduction of the calcium sulfate with emission of gas, also resulted in an inferior rounding process. In addition to a lower yield, it was noted that foreign materials adhered to the surface of the glass balls thereby requiring a cleaning operation. Further, the performances of the glass balls and particularly their resistance to crushing was found to be quite inferior to the glass balls obtained according to the invention.

Quicklime or slaked lime, or decarbonated dolomite prove unsatisfactory, also. The treated glass balls having undergone treatment with this substitution exhibited a poor surface state, irregular shape and slight resistances to crushing.

Also, it has been found generally that the substitution of decarbonated powder collected at hopper 26 in the rounding treatment according to the invention is not advantageously substituted even for partial amounts of limestone and dolomite.

Having described the invention with particular reference to the preferred form thereof, it will be obvious to those skilled in the art to which the invention pertains after understanding the invention, that various changes and modifications may be made therein without departing from the spirit and scope of the invention as defined by the claims appended hereto.

We claim:

1. A product formed of a particulate ceramizable glass material having a granular dimension of about 1 to about 3.5 mm and a substantially rounded, spherical shape by a thermal treatment within a temperature range of from about 950° to about 1200° C., said material having a crystallization rate of at least 30%, essentially in the form of wollastonite $\alpha$ and $\beta$, and a resistance to crushing of at least 4,000 bars.

2. The product of claim 1 wherein said material is formed to a ball having a diameter of from about 0.8 to about 3 mm.

3. The product of claim 1 wherein said material has an instantaneous viscosity from about $10^6$ to about $10^{3.5}$ poises within said temperature range.

4. The product of claim 1, 2 or 3 wherein said material has a composition (by weight percent) of

| | |
|---|---|
| $SiO_2$ | 56.0 to 58.0 |
| $Al_2O_3$ | 8.2 to 9.7 |
| CaO | 17.5 to 19.0 |
| MgO | 2.8 to 3.3 |
| $K_2O$ | 5.1 to 5.9 |
| $Na_2O$ | 1.0 to 1.2 |
| $Li_2O$ | 0.2 to 0.5 |
| $B_2O_3$ | 3.5 to 4.5 |
| ZnO | 0.5 to 1.0 |
| S (total) | 0.2 to 0.5. |

* * * * *